FIG-6

Patented Dec. 30, 1930

1,787,411

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

APPARATUS FOR REENFORCING TIRE BEADS

Application filed June 11, 1926. Serial No. 115,249.

This invention relates to procedure and apparatus for reenforcing beads, and particularly those of the larger sizes, frequently called giant beads, for straight side pneumatic tires of rubber and fabric.

Heretofore, beads of the larger sizes have been reenforced by hand. Many attempts have been made to provide a method whereby suitable apparatus may be employed effectively to construct such beads and to provide apparatus to carry out such method, but methods and apparatus heretofore employed have not been sufficiently successful to compete with the hand method either in expense or in quality of workmanship.

The general purpose of the present invention is to provide a practicable method and apparatus for effectively carrying out said method, whereby giant beads are well and inexpensively reenforced.

The foregoing and other objects are obtained by the method and devices illustrated in the accompanying drawings and described below. It is to be understood that the invention is not limited to the specific embodiment thereof disclosed herein.

Of the accompanying drawings.

Referring to the drawings, the numeral 11 (Figure 10) illustrates an endless, inextensible, straight side bead constructed in a known manner and reenforced by a composite band 12 folded about the bead and formed with a flipper portion 13 which anchors the bead in the carcass of the tire. The present apparatus and procedure are designed to manufacture such beads, and especially those of the larger sizes for tires such as truck and bus tires.

Figure 1:
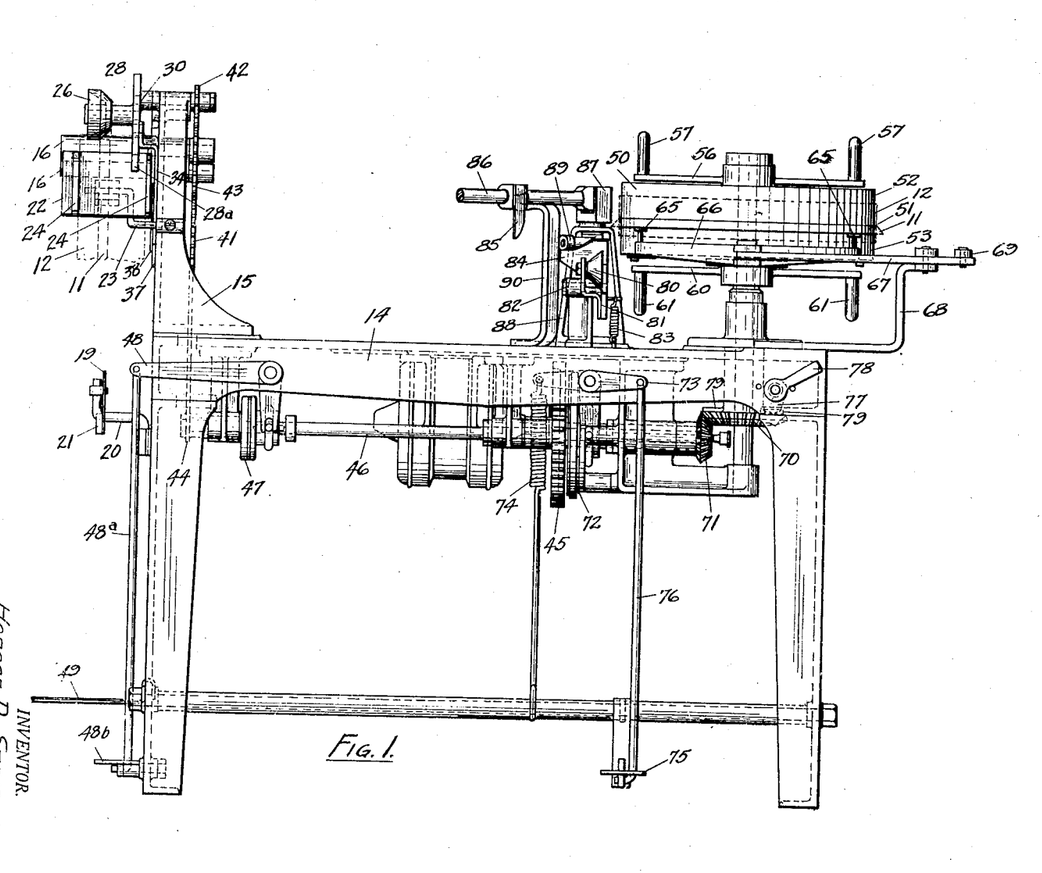
Figure 1 is a front elevation of bead reenforcing apparatus constructed in accordance with and adapted to carry out the invention.
Figure 2:
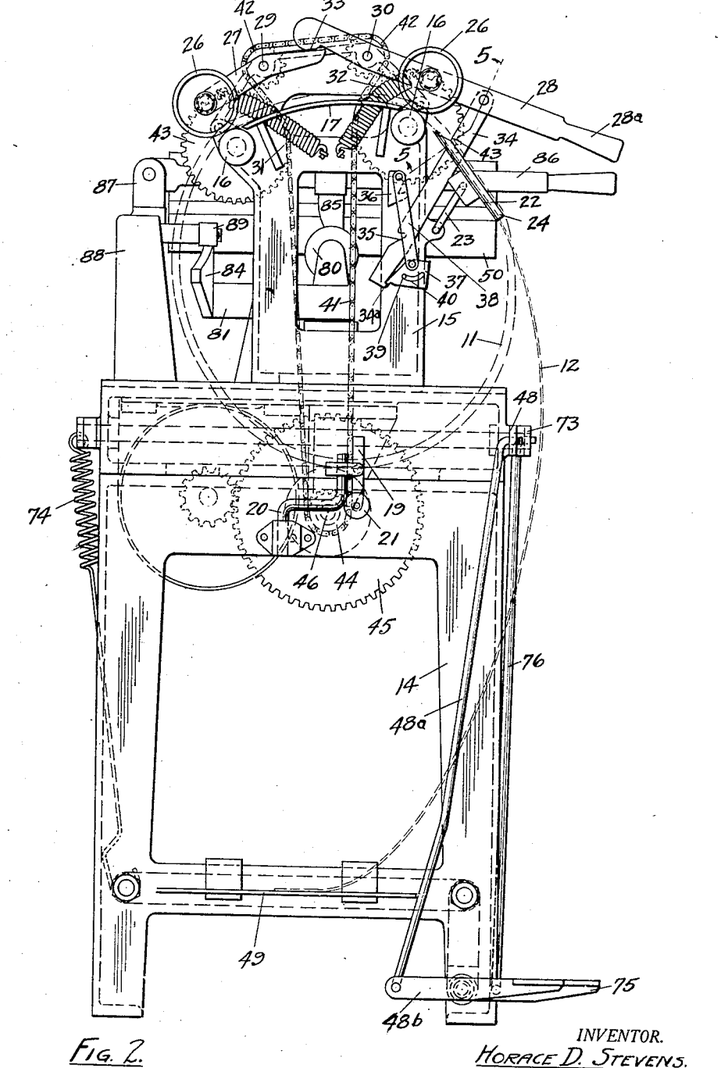
Figure 2 is a left end elevation thereof.
Figure 3:
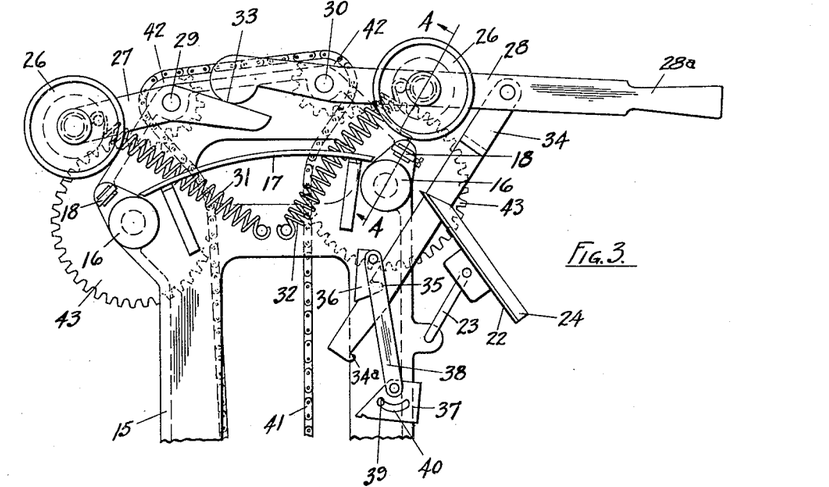
Figure 3 is a detail left end elevation illustrating the reenforcing strip applying mechanism.
Figure 4:
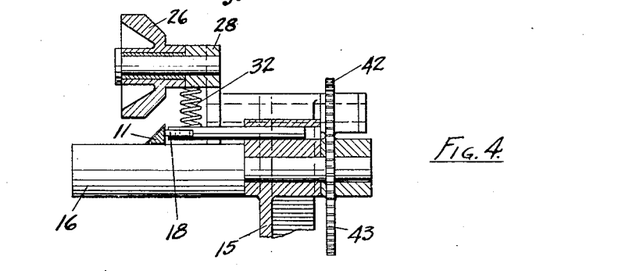
Figure 4 is a section on line 4—4 of Figure 3.
Figure 5:
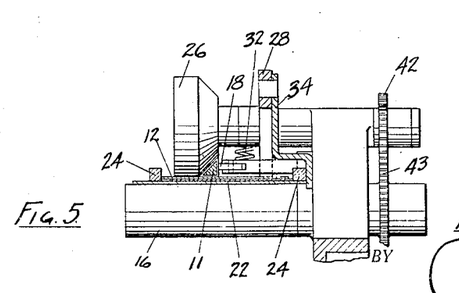
Figure 5 is a section on line 5—5 of Figure 2.
Figure 6:
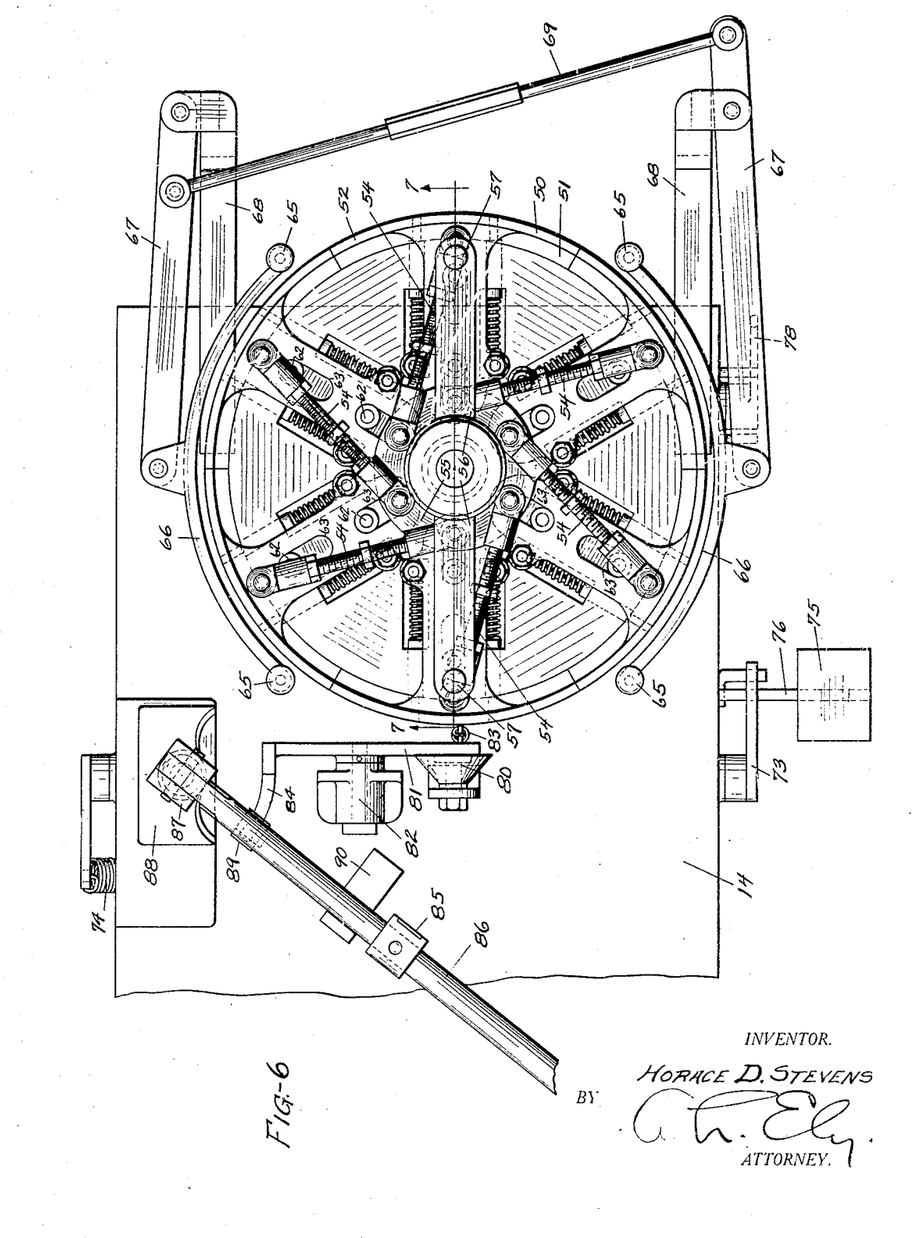
Figure 6 is a plan of the reenforcing strip folding and flipping mechanism.
Figure 7:
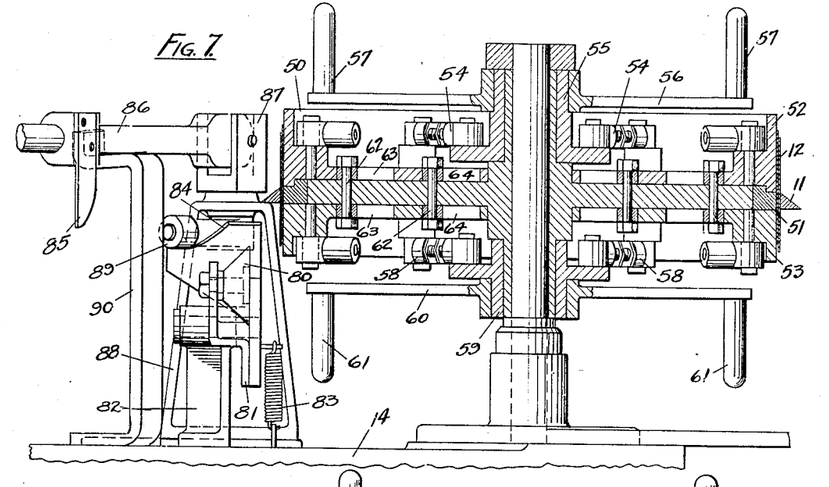
Figure 7 is a part section on line 7—7 of Figure 6.
Figures 8, 9, 10:
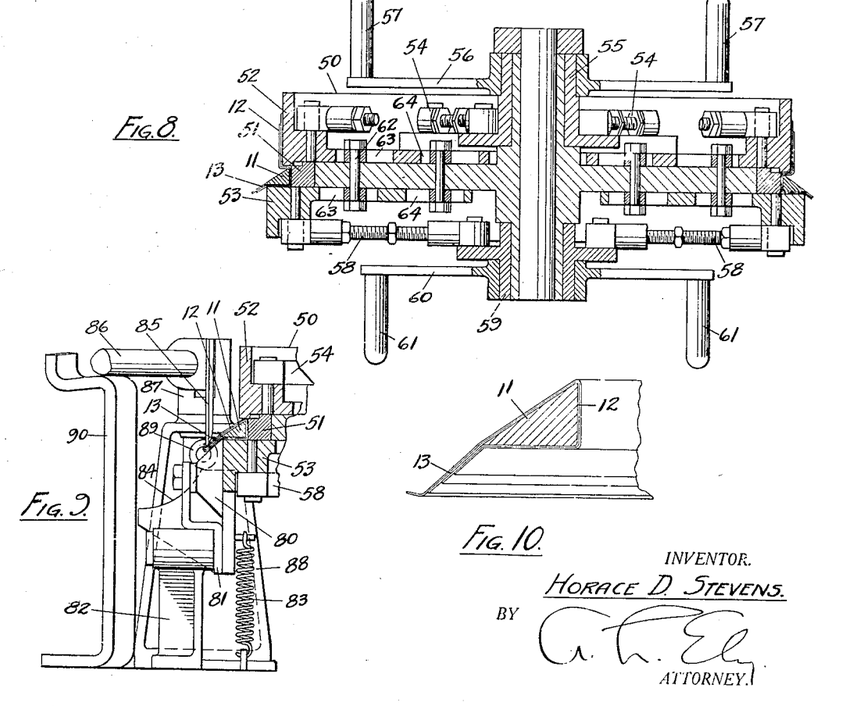
Figure 8 is a repetition of part of the preceding view illustrating the strip folding instrumentalities in operation about a bead.
Figure 9 is a repetition of another portion of Figure 7 illustrating the flipper forming mechanism in operation on the bead.
Figure 10 is a section through a completed reenforced bead ready for placement onto a tire carcass.

The method consists in forming the annular bead of substantially right triangular shape in section; in forming a stepped composite reenforcing strip; in applying the reenforcing strip about the inner periphery thereof to provide a transversely flat band secured to the inner periphery of the bead as illustrated in Figures 1 to 5; in next folding the strip outwardly about the "heel" and "toe" of the bead, as illustrated in Figures 7 and 8; and finally in flipping one side of the strip downwardly over the hypotenuse of the bead onto the other side of the strip to provide the flipper for anchoring the bead in the tire.

*Strip applying mechanism*

This apparatus may be mounted on a table 14, a bracket 15 being mounted on one end thereof, in which are journaled transversely flat, bead supporting and driving rollers 16, 16 bridged by a curved support 17 on which the bead rides. For aligning the bead accurately in the machine, rollers 18, 18 arranged above rollers 16 are provided to engage the inner side of the bead when placed on rollers 16, and a guide 19 is freely pivoted on a bracket 20 on table 14 and is normally urged upwardly by a weight 21 thereon so as to engage the inner side of the lower portion of the bead to prevent wabbling of the bead on rollers 16, and consequent improper application of the reenforcing strip.

An upwardly directed, strip guiding plate 22 is provided for directing the reenforcing strip into proper position against the inner periphery of the bead, plate 22 being supported on a bracket 23 secured on bracket 15 and having guide bars 24, 24 secured on its upper surface to engage the edges of the strip 12.

For pressing the strip 12 and bead 11 together, rollers 26, 26 are arranged to operate against the hypotenuse of bead 11 to press the bead 11 and strip 12 against rollers 16. Rollers 26 are mounted on levers 27 and 28, pivoted respectively at 29 and 30 on bracket 15, and having springs 31 and 32 respectively connected thereto, and to bracket 15 for normally urging rollers 26 against rollers 16. Lever 28 is provided with a handle 28ª and levers 27 and 28 have cooperating cam surfaces at 33, whereby upward movement of lever 28 will elevate rollers 26 from rollers 16 to facilitate placing work in the machine. Suitable mechanism for releasably latching the lever 28 in its upper position may be provided in the form of a latch bar 34 provided with a notch 35 into which a latch 36, pivoted on bracket 15, is adapted to engage. Latch bar 34 is automatically operable into engagement with latch 36 by upward movement of lever 28 since bar 34 has a hook 34ª on its lower end arranged to engage a dog 37 pivoted on a link 38 suspended from the pivot of latch 36, dog 37 being guided by a pin 39 on bracket 15 engaged in an arcuate slot 40 in said dog, whereby dog 37 will swing bar 34 upon upward movement of lever 28 into engagement with latch 36 so that the latter will fall into notch 35.

Driving of rollers 16 may be accomplished by means of a chain 41 trained over sprockets 42, 42 journaled on the top of bracket 15 and meshed with sprockets 43, 43 secured on rollers 16. Chain 41 may be driven by a sprocket 44 arranged to be driven by a gear 45 journaled on a shaft 46 and adapted to be clutched thereto by a clutch 47 operable by a bell crank lever 48 pivoted on table 14 and connected by a rod 48ª to a pedal 48ᵇ.

Arranged beneath the strip applying mechanism adjacent the bottom of table 14 is a shelf 49 for supporting the end of the covering strip to prevent its engagement with the floor.

*The strip folding and flipping mechanism*

This mechanism includes a rotary drum 50 preferably arranged to rotate in a horizontal plane on table 14 and provided with a central fixed portion 51 and radially expansible sectional portions 52 and 53, the central portion 51 being adapted to engage the inner periphery of the bead and the portions 52 and 53 to fold the strip 12 respectively about the toe and heel of the bead (Figure 8). Sections 52 are operable outwardly by toggle links 54, 54 connected to a central rotatable member 55 adapted to be manually rotated by a member 56 having handles 57, 57 thereon. Sections 53 are similarly operable by links 58, 58 connected to a central member 59 operable by a member 60 having handles 61, 61 thereon. Sections 52 and 53 are guided radially by bolts 62, 62 extending through the fixed drum portions 51 and engaged in slots 63, 63 and 64, 64, respectively, in sections 52 and 53. Links 54 and 58 are adjustable as to length so that the throw of sections 52 and 53 may be such distances beyond the fixed drum portion 51 as are shown in Figure 8, whereby the flipping operation is facilitated.

For positioning the bead and reinforcing strip so that the bead extends about the fixed portion 51 and the projecting portions of the strip to be folded lie on the sections 52 and 53 (Figure 7), bead engaging supports 65, 65 are arranged about drum 50, preferably being supported in pairs on brackets 66, 66 arranged on opposite sides of drum 50 and movable toward and from bead supporting relation to drum 50 by levers 67, 67 pivoted on brackets 68, 68 mounted on table 14 and connected by a link 69 so that the supports 65 are simultaneously operable toward and from the drum.

To the end that the drum 50 may be driven for a flipping operation, a gear 70 is connected thereto and meshes with a gear 71, journaled on shaft 46 and arranged to be clutched thereto by a clutch 72 operable by a lever mechanism 73 normally urged into disengaged position by a spring 74 but adapted to urge the clutch into engagement under the action of a pedal 75 connected thereto by a link 76. For holding drum 50 fixed during application of the bead and strip thereto, a stop 77 is arranged to be swung by a handle 78 into slots as indicated at 79 on the upper face of gear 70.

The flipping mechanism includes a conical roller 80 mounted on a lever 81 pivoted on a bracket 82 and adapted to be actuated to elevate roller 80 against the action of a spring 83 by means of a cam 84 thereon. Roller 80 is thus operable into a position (Figure 9) under the lower portion of strip 12 projecting beyond the outer periphery of the bead to provide a support against which the flipping of the upper portion of the strip 12 may take place.

The flipper element comprises a blade 85 mounted on a lever 86 so as to be operable downwardly on the surfaces of drum sections 52 while drum 50 is rotated to lift the upper portion of strip 12 off the drum, to stitch the said portion of the strip over the hypotenuse of the bead, and finally to stitch the portion thereof projected beyond the bead onto the lower portion of the strip on roller 80 to form the flipper 13. Lever 86 is accordingly pivoted for vertical swinging movement on a swivel 87 mounted on a bracket 88 so that the lever may also be swung toward and from the drum 50. Lever 86 carries a roller 89 arranged to engage cam 84 to elevate roller 80 into flipper forming position as the stitcher blade 85 is swung into operative position. A rest 90 may be mounted on table 14 to support lever 86 in non-operative position.

During operation of the apparatus, it will be understood that one operative is stationed at the strip applying device and another at the strip folding and flipping device. Endless beads 11 and strips 12 are furnished the first operative who positions the beads on rollers 16 against guide rollers 18 and guide 19. One end of the strip 12 is rested on shelf 49 and the other end is placed under bead 10 on guide plate 22 between rails 24 and is pressed against the inner periphery of bead 10. Handle 28ª is then actuated to disengage latch 36 from notch 35 and springs 31 are permitted to urge rollers 26 against the hypotenuse of bead 10. Pedal 48ᵇ is then depressed to drive shaft 46 whereby the bead 10 is circumferentially driven and the strip 12 is progressively drawn over plate 22 and affixed to the inner periphery of the bead, pedal 48ᵇ being released when the bead has made a complete revolution. Guide 19 yields under engagement of strip 12 therewith. Since strips 12 are preferably cut to length so that their ends will be properly spliced by the machine, the first operation is now completed.

The bead 11 with the band of fabric 12 secured to its inner periphery is then taken by the second operative who adjusts supports 65 close to drum 50 and drops the bead 10 thereon so that it will be positioned on the fixed portion 51 of drum 50. Members 56 and 59 are then manually rotated to expand sections 52 and 53, whereby the strip 12 is folded about bead 11 as shown in Figure 8. Stop 77 is then disengaged from gear 70 and pedal 75 is depressed to drive drum 50. Lever 86 is now lifted off rest 90 and swung to a position with blade 85 against the upper part of sections 52, whereupon the blade is operated gradually downwardly between the strip 12 and the drum to turn the strip over the hypotenuse of bead 10 against which it is progressively stitched by continued downward movement of the blade 85. Swinging of the lever 86 over to the drum and its downward movement are effective through roller 89 and cam 84 to elevate roller 80 to a position under the lower marginal portion of strip 12 which has been folded outwardly by sections 53. Accordingly roller 80 provides a support against which continued downward stitching operation of blade 85 is effected to form the flipper 13 on the bead. Upon completion of this stitching operation, pedal 75 is released, lever 86 is placed back on rest 90 and the completed reenforced bead is removed from the machine.

It will be apparent that very rapid procedure and apparatus have been provided for reenforcing beads. They are capable of use to reenforce beads of the larger sizes better than they have heretofore been by hand, a result which, so far as the present inventor is aware, has never before been accomplished.

Modifications of the invention may be resorted to without departing from the spirit thereof or the scope of the appended claims.

What is claimed is:

1. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, bead aligning supports operable toward and from the periphery of the drum to positions for supporting a bead about the central portion of the drum, means for holding the drum against rotation to facilitate mounting a bead thereon, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, a roller movable to a position adjacent the periphery of the drum to provide a support on which a flipper may be formed on the bead and against which the stitcher blade may be actuated by said lever, said roller being mounted on a second lever having a cam thereon, and said first lever having a follower thereon for engaging said cam to move said roller to operative position when the stitcher blade is moved toward the drum, and a rest for said first lever to support it away from the drum.

2. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, bead aligning supports operable toward and from the periphery of the drum to positions for supporting a bead about the central portion of the drum, means for holding the drum against rotation to facilitate mounting a bead thereon, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, and a roller movable to a position adjacent the periphery of the drum to provide a support on which a flipper may be formed on the bead and against which the stitcher blade may be actuated by said lever, said roller being mounted on a second lever having a cam thereon, and said first lever having a follower thereon for engaging said cam to move said roller to operative position when the stitcher blade is moved toward the drum.

3. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, bead aligning supports operable toward and from the periphery of the drum to positions for supporting a bead about the central portion of the drum, means for holding the drum against rotation to facilitate mounting a bead thereon, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, a roller movable to a position adjacent the periphery of the drum to provide a support on which a flipper may be formed on the bead and against which the stitcher blade may be actuated by said lever, and means for operating said roller to operative position by movement of the stitcher toward the drum.

4. Apparatus for reenforcing beads, comprising a horizontally rotatable drum having a fixed central portion and radially expansible sectional portions on either side thereof, said central portion constituting a seat for a bead and said sectional portion constituting folders for folding a strip outwardly about the bead, means for expanding each sectional portion of the drum, bead aligning supports operable toward and from the periphery of the drum to positions for supporting a bead about the central portion of the drum, means for holding the drum against rotation to facilitate mounting a bead thereon, means for rotating the drum, a stitcher blade movable downwardly over the surface of the drum while it is rotating, means for operating the stitcher, a roller movable to a position adjacent the periphery of the drum to provide a support on which a flipper may be formed on the bead and against which the stitcher blade may be actuated, and means for simultaneously operating the stitcher and the roller to operative positions relative to the drum.

5. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, bead aligning supports operable toward and from the periphery of the drum to positions for supporting a bead about the central portion of the drum, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, and a roller movable to a position adjacent the periphery of the drum to provide a support on which a flipper may be formed on the bead and against which the stitcher blade may be actuated by said lever, said roller being mounted on a second lever having a cam thereon, and said first lever having a follower thereon for engaging said cam to move said roller to operative position when the stitcher blade is moved toward the drum.

6. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, bead aligning supports operable toward and from the periphery of the drum to positions for supporting a bead about the central portion of the drum, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, a roller movable to a position adjacent the periphery of the drum to provide a support on which a flipper may be formed on the bead and against which the stitcher blade may be actuated by said lever, and means for operating said rollers to operative positions by movement of the stitcher toward the drum.

7. Apparatus for reenforcing beads, comprising a horizontally rotatable drum having a fixed central portion and radially expansible sectional portions on either side thereof, said central portion constituting a seat for a bead and said sectional portion constituting folders for folding a strip outwardly about the bead, means for expanding each sectional portion of the drum, bead aligning supports operable toward and from the periphery of the drum to positions for supporting a bead about the central portion of the drum, means for rotating the drum, a stitcher blade movable downwardly over the surface of the drum while it is rotating, means for operating the stitcher, a roller movable to a position adjacent the periphery of the drum to provide a support on which a flipper may be formed on the bead and against which the stitcher blade may be actuated, and means for simultaneously operating the stitcher and the roller to operative positions relative to the drum.

8. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, and a roller movable to a position adjacent the periphery of the drum to provide a support on which a flipper may be formed on the bead and against which the stitcher blade may be actuated by said lever, said roller being mounted on a second lever having a cam thereon, and said first lever having a follower thereon for engaging said cam to move said roller to operative position when the stitcher blade is moved toward the drum.

9. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, a roller movable to a position adjacent the periphery of the drum to provide a support on which a flipper may be formed on the bead and against which the stitcher blade may be actuated by said lever, and means for operating said roller to operative position by movement of the stitcher toward the drum.

10. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, means for rotating the drum, a stitcher blade movable downwardly over the surface of the drum while it is rotating, means for operating the stitcher, a roller movable to a position adjacent the periphery of the drum to provide a support on which a flipper may be formed on the bead and against which the stitcher blade may be actuated, and means for simultaneously operating the stitcher and the roller to operative positions relative to the drum.

11. Apparatus for reenforcing beads, comprising a horizontally rotatable drum having a fixed central portion and radially expansible sectional portions on either side thereof, said central portion constituting a seat for a bead and said sectional portions constituting folders for folding a strip outwardly about the bead, means for expanding each sectional portion of the drum, means for rotating the drum, a stitcher blade movable downwardly over the surface of the drum while it is rotating, means for operating the stitcher comprising a lever supporting said blade and pivoted to swing horizontally toward and from the periphery of the drum and also vertically thereof, and a roller movable to a position adjacent the periphery of the drum to provide a support on which a flipper may be formed on the bead and against which the stitcher blade may be actuated.

12. Apparatus for reenforcing beads of triangular section, comprising a horizontally rotatable drum having a fixed peripheral portion and radially expansible sectional portions above and below the same, the upper sections being expansible beyond the toe of the bead and the lower sections being expansible under the lower side of a bead arranged about the fixed portion of the drum, a support movable to a position adjacent the drum under the bead, and a stitcher mounted so as to be movable downwardly over the upper sections of the drum, the hypotenuse of the bead, and over the support.

13. Apparatus for reenforcing beads of triangular section, comprising a horizontally rotatable drum having a fixed peripheral portion and radially expansible sectional portions above and below the same, the upper sections being expansible beyond the toe of the bead and the lower sections being expansible under the lower side of a bead arranged about the fixed portion of the drum, and a stitcher mounted so as to be movable downwardly over the upper sections of the drum and the hypotenuse of the bead.

14. Apparatus for reenforcing beads comprising a rotatable drum for receiving a bead circumferentially thereabouts, folders on the drum for folding a strip of material outwardly about the bead so that a portion of the strip projects from the drum, and mechanism operable adjacent the drum for stitching one portion of the strip against the bead and for forming the projecting portion of the strip into a flipper.

15. Apparatus for reenforcing beads comprising a rotatable drum for receiving a bead circumferentially thereabout, folders on the drum for folding a strip of material outwardly about the bead so that a portion of the strip projects from the drum, and mechanism operable adjacent the drum for forming the projecting portion of the strip into a flipper.

16. Apparatus for reenforcing beads comprising a rotatable drum for receiving a bead circumferentially thereabout, folders on the drum for folding a strip of material outwardly about the bead so that a portion of the strip projects from the drum, and mechanism operable adjacent the drum for forming the projecting portion of the strip into a flipper, said mechanism comprising a stitcher and a support against which the flipper can be stitched.

17. Apparatus for reenforcing beads comprising a rotatable drum for receiving a bead circumferentially thereabout, folders on the drum for folding a strip of material outwardly about the bead so that a portion of the strip projects from the drum, and mechanism operable adjacent the drum for forming the projecting portion of the strip into a flipper, said mechanism comprising a stitcher and a support against which the flipper can be stitched, and common means for actuating the stitcher and the support toward and from operative relation to the drum.

HORACE D. STEVENS.